US012743601B2

(12) United States Patent
Zoldi et al.

(10) Patent No.: US 12,743,601 B2
(45) Date of Patent: Sep. 22, 2026

(54) LATENT FEATURE BASED MODEL BIAS MITIGATION IN ARTIFICIAL INTELLIGENCE SYSTEMS

(71) Applicant: FAIR ISAAC CORPORATION, Roseville, MN (US)

(72) Inventors: Scott Michael Zoldi, San Diego, CA (US); Shafi Ur Rahman, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1410 days.

(21) Appl. No.: 17/473,687

(22) Filed: Sep. 13, 2021

(65) Prior Publication Data

US 2023/0085575 A1 Mar. 16, 2023

(51) Int. Cl.
*G06N 3/04* (2023.01)

(52) U.S. Cl.
CPC .................................... *G06N 3/04* (2013.01)

(58) Field of Classification Search
CPC ........................................................ G06N 3/04
See application file for complete search history.

(56) References Cited

U.S. PATENT DOCUMENTS

| | | | | |
|---|---|---|---|---|
| 11,151,450 | B2 | 10/2021 | Zoldi et al. | |
| 2019/0354853 | A1* | 11/2019 | Zoldi | G06N 3/08 |
| 2021/0383268 | A1* | 12/2021 | Miroshnikov | G06N 20/00 |
| 2022/0012591 | A1* | 1/2022 | Dalli | G06F 18/10 |
| 2022/0383167 | A1* | 12/2022 | Venugopalan | G06N 3/063 |

* cited by examiner

*Primary Examiner* — Sherrod L Keaton
(74) *Attorney, Agent, or Firm* — Mintz, Levin, Cohn, Ferris, Glovsky and Popeo, P.C.; F. Jason Far-hadian, Esq.

(57) ABSTRACT

To eliminating bias from artificial intelligent (AI) systems, a list of class identifiers and features derived from class identifiers represented in training data fed to an AI system are identified for purpose of training a predictive model. Correlation analysis of input features is conducted from a list of raw variables, r, in a dataset and a plurality of derived features, x, with one or more class identifiers in the list of class identifiers and features derived from these class identifiers. A first list of input features is identified, one or more input features are in the first list belonging to and correlated with the one or more class identifiers or features derived from class identifiers. A second list of sets of input features is created to identify a set of combinations of input features that are not allowed to interact based on identifying biased latent features.

10 Claims, 14 Drawing Sheets

| LF bins | Class value 1 | ... | Class value P | Row total |
| --- | --- | --- | --- | --- |
| $Bin_1$ | $c_{11}$ | | $c_{P1}$ | $c_{11} + \ldots + c_{P1}$ |
| $Bin_2$ | $c_{12}$ | | $c_{P2}$ | |
| | | | | |
| $Bin_N$ | $c_{1N}$ | | $c_{PN}$ | $c_{1N} + \ldots + c_{PN}$ |
| Column total | $c_1$ | ... | $c_P$ | |

*FIG. 4C*

| Latent Feature | Set of features that are not allowed to interact |
| --- | --- |
| $LF_2^1$ | $(f_1, f_3)$ |
| $LF_4^1$ | $(f_2, f_3)$ |

*FIG. 5B*

| Set of features that are not allowed to interact |
| --- |
| $(f_1, f_5)$ |
| $(f_2, f_3)$ |
| $(f_1, f_4)$ |

| Set of features that are not allowed to interact |
| --- |
| $(f_1, f_5)$ |
| $(f_2, f_3)$ |
| $(f_1, f_4)$ |
| $(f_3, f_5, f_4, f_6)$ |

LATENT FEATURE BASED MODEL BIAS MITIGATION IN ARTIFICIAL INTELLIGENCE SYSTEMS

TECHNICAL FIELD

The disclosed subject matter generally relates to artificial intelligence modeling and, more particularly, to mitigating certain biases in predictive models developed for self-learning systems.

BACKGROUND

Artificial intelligence (AI) systems are highly data driven systems that are typically implemented using machine learning. A machine learning model is created based on learning the mathematical representation of relationships that exist within a training dataset. The model, based on earlier training, yields classification outcomes in response to data fed to the model. Training an AI system involves providing input data to the model and adjusting predictive features and model weights in the model's representative mathematical formula with the intention to improve the model's prediction accuracy.

It is not uncommon for the training data to include values or trends that reflect societal bias or other types of bias. This can be due to a variety of reasons, such as the way data was collected or the source of data. As such, self-learning models may be trained based on discriminatory or illegal biases learned by the model under the influence of data values in the training dataset as the model learns a multitude of possible relationships in the training data, unless special precaution is taken.

As an example, a model for income prediction may be trained on a training dataset where a disproportionately large population of individuals of a particular race or ethnicity are represented in the lower income category. If so, without precautions for controlling bias, a protected class such as race or ethnicity may act as a predictive feature in the predictive model. This would result in discriminatory classifications against one or more class identifiers associated with protected classes of individuals which would be ethically inappropriate and further can violate anti-discrimination laws.

Certain precautions can be taken while developing AI models to ensure against such discriminatory influences in training. One approach would be to eliminate input features that directly lead to discrimination or undesirable bias. This approach requires identifying input features that may reflect those biases on their own accord and explicitly excluding those input features from the model as predictors. Such input features are the protected classes or features that are directly derived from the protected classes. We call the bias introduced in a model by such input features as the first order effect. For example, if race or gender driven bias is to be excluded from a model, elimination of first order effect would involve eliminating race or gender information and all variables derived from that information as input predictors for the model.

Unfortunately, often removing the first order effect features is insufficient in eliminating all undesirable bias from a model. This is because AI models explore large amounts of relationships and even if the first order effect features including protected classes (e.g., race or gender) are explicitly excluded, the AI model may still impute bias from related non-excluded relationships. More particularly, there may be secondary information in the training data that is correlated with the first order effect features, such that the model may incorporate those correlated features and impute bias.

For example, some studies have shown that zip code data has correlation to race in the United States. In such a scenario, if the model happens to use zip code data as one of the input predictors, this will allow race-related imputed bias to creep into the model. Biases learned from such features in the data represent a second order effect. To eliminate second order effects while training an AI model, a proper correlation analysis is needed that can identify these second order effects of imputed biased information and eliminate them from AI models.

Because many datasets have hidden nonlinear relationships in the data, these relationships need to be reviewed to determine or remedy biased outcome learned from the hidden relationships as these hidden relations can act as proxy for the bias toward certain groups, entities, objects, classes, or other artifacts. Most non-linear models would learn such hidden relationships as they are designed to discover nonlinearities that maximize the model prediction. For example, in neural network models, complex nonlinear relationships are learnt by the hidden nodes of the model. Hence, merely addressing first and second order effect are not sufficient in such cases.

In such situations, it is up to data scientists to review all learned relationships to expose bias and remediate. Detecting and eliminating bias effects can be a cumbersome task for a human operator. In particular, there is no reliable technique available for detecting bias effects of higher orders. Further, some data scientists resort to measuring the disparate impact of the model based on the outcome data and then adjust their model. This approach has come under legal scrutiny, however. As such methods for bias detection and remediation are needed that are not directly based on model score and historical outcome data.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, systems and method for eliminating bias from artificial intelligent (AI) systems are provided. A list of class identifiers and features derived from class identifiers represented in training data fed to an AI system are identified for purpose of training a predictive model in the AI system. Correlation analysis of input features is conducted from a list of raw variables, r, in a dataset and a plurality of derived features, x, with one or more class identifiers in the list of class identifiers and features derived from these class identifiers. A first list of input features is identified, where one or more input features are in the first list belonging to and correlated with the one or more class identifiers or features derived from class identifiers. A second list of sets of input features is created. The second list of sets of input features identify a set of combinations of input features that are not allowed to interact due to learned nonlinearities that result in bias.

In certain aspects, the predictive model is trained using the first list and the second list to eliminate bias from the predictive model by removing the features and feature combinations in the combined list as model input and allowed nonlinearities expressed in the predictive model which include features in the first list or combinations of features in the second list, known as latent features. A latent feature is determined to be biased, in response to determining that the latent feature demonstrates a discriminatory distribution against a protected class of individuals. The latent feature output is binned into N bins, such that N is a universal constant specified per latent feature. For a protected class, a two-way table is generated with counts, $C_{ij}$, where a latent feature, $$LF_j^k$$

is binned into N bins, and a protected class $PC_m$, has P class values, and a cell value, Cij represents an instances of the $i^{th}$ class value in the $j^{th}$ bin. An expected value Eij is given by:

$$E_{ij} = \frac{\left(\sum_j C_{ij}\right) * \left(\sum_i C_{ij}\right)}{\left(\sum_{i,j} C_{ij}\right)}$$

and the Chi-square statistics is given by $$X = \sum_{i,j} \frac{(C_{ij} - E_{ij})^2}{E_{ij}}.$$

The chi-square statistics computed in this manner provides for a determination whether the latent feature is biased against at least one of the class identifiers of the protected class. If so, the features defining the latent feature are marked to not interact. If one or both features defining the biased latent feature are themselves latent features, then iteratively input features that together in combination define the biased latent feature are determined and are marked to not interact. This process may be repeated for all latent features and each latent feature is investigated for all protected classes until it is demonstrated that all meet a threshold of statistical significance of not being statistically different, or biased. After identifying combinations of features whose interaction leads to biased latent features, the model is retrained and the process is repeated until the model has no biased latent feature left.

In certain embodiments, a P-value for the chi-square statistics is computed to determine the statistical significance of difference in the chi-square distribution with df degrees of freedom. The determination of a biased latent feature towards a class value results in determining the combination of features contributing to the latent feature and the combination of features being added to the second list of sets of input features. The biased latent feature may be approximated with a sparse set of multiple latent features to explode the latent feature into a set of lower complexity latent features and nonlinearities.

In this context, exploding a node refers to an equivalent learned approximation of the latent feature being replaced with a sparsely connected interpretable neural network. This interpretable neural network enforces that the sparsely connected set of latent features are one or two connections which allows a sparse interpretable representation of the previously dense and not interpretable node. The sparse set of lower complexity latent features may be investigated for bias to determine which lower complexity latent features are identified as being biased. The identified latent features, in certain aspects, are added to the second list of sets of input features.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

FIG. 4C is an example two-way table, where a latent feature and a protected class have been binned in accordance with one implementation.

FIG. 5B is an example list of latent features in the first hidden layer that have bias with respect to a protected class, along with the input features that they are based on, which will be restricted from interacting.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
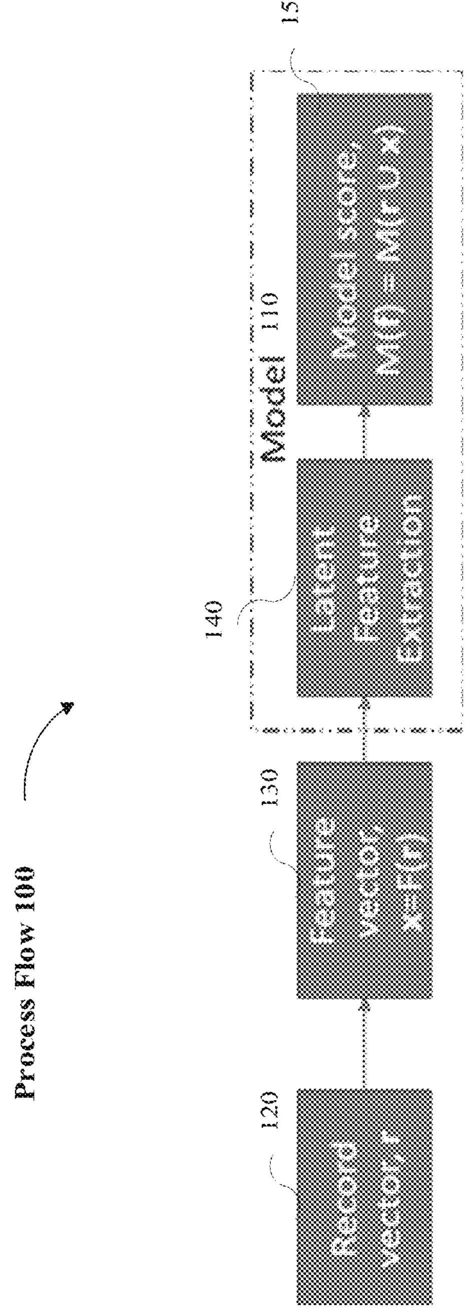
FIG. 1 illustrates an example process flow of a record vector getting scored by a model.

Referring to FIG. 1, a process flow 100 is illustrated. As shown, a model 110 may use some of the fields from a record vector 120, r, as input variables (i.e., raw variables). In some instances, the fields from the record vector 120 may go through a transformation (e.g., a feature extraction). A derived feature vector 130, x (i.e., representing one or more features) can act as input variables of the model 110. It is convenient to represent the feature vector 130 as a function, F, of the record vector 120 where the functional transform represents the feature extraction process. Thus, the feature vector 130, x, may be given by x=F(r).

The model 110 may use a combination of raw variables, $r_i$, from the record vector 120, r and derived features, $x_i$, from the feature vector 130, x, as model input. A union of these two sets may be represented by f where, $f=r\cup x$. The model 110 then learns and extracts complex relationships in the data between various extracted latent features 140 represented by x and r.

In a neural network model, the learning and extraction of latent features happens explicitly by virtue of the model's architecture, M. The model 110 then learns to associate these latent features 140 to generate a model score 150, where: $M(f)=M(r\cup x)$. Thus, the final score is based on the latent features. As shown in FIG. 1, prior stages influence the later stages. In certain embodiments, input features that have a first order (data element) or second order (derived features) bias impact on the model are excluded using the expert knowledge or direct correlation with protected class information.

Figure 2:
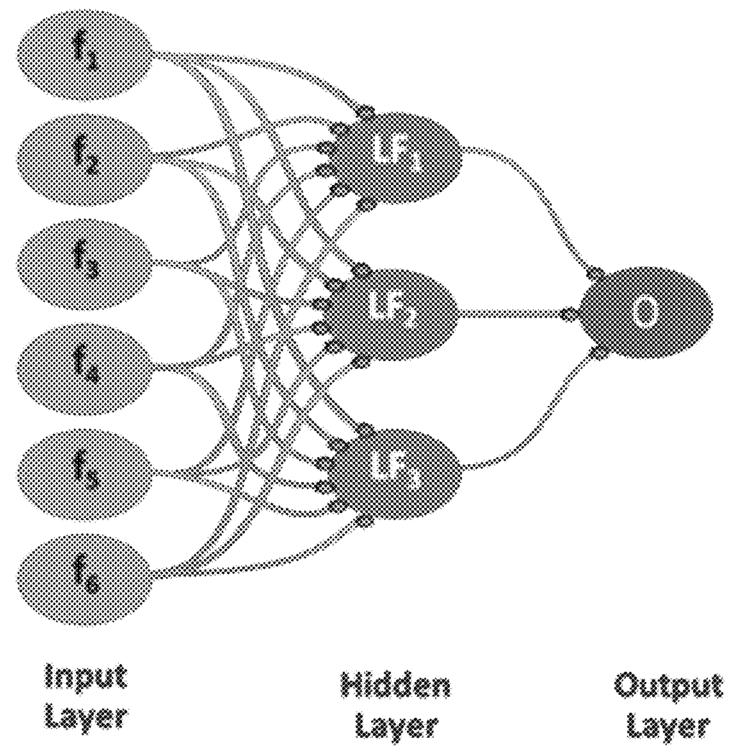
FIG. 2 is an example a neural network model including a single hidden layer, where a hidden node, LFj, represents a latent feature learnt explicitly by the model, in accordance with one embodiment.

Referring to FIG. 2, one or more embodiments are configured for investigating and exposing whether a latent feature is biased against one or more groups or entities (e.g., a protected class of individuals). As shown, a neural network model may include a single hidden layer, where a hidden node, LFj, represents a latent feature learnt explicitly by the model and j is the index for the latent feature. The small circular dots next to a node represent the weight of a connection or edge in the model. The output of a node LFj is the nonlinear transform S( ) driven by equations (1.a) and (1.b) below.

In a neural network model, latent features may be represented by one or more hidden layers which are functions of a non-linear transform of weighted sum of inputs from the previous layer. For example, in FIG. 2, which has a single hidden layer, a latent feature, $LF_j$ is given by the following equation:

$$LF_j = S\left(\sum_i w_{ij} \cdot f_i\right), \text{ with } f_0 = 1 \tag{1.a}$$

where, S is a non-linear transform, often, $$S(y) = \frac{1}{1+\exp(-y)} \tag{1.b}$$

$f_1, f_2, \ldots f_i, \ldots$ are the model input variables that are the features of the feature vector f, and $w_{ij}$ is the weight of the edge connecting the input variable $f_i$ to the latent feature, $LF_j$.

Some neural networks can have more than one hidden layer. If k is the number of hidden layers in a neural network, for k>1, each latent feature in a hidden layer is a function of latent features from the previous layer. Then the equation (1.a) can be reformulated as follows:

$$LF_j^{k=1} = S\left(\sum_i w_{ij}^{k=1} \cdot f_i\right) \text{ with } f_0 = 1 \text{ and} \tag{1.c}$$

$$LF_j^{k>1} = S\left(\sum_i w_{ij}^{k} \cdot LF_i^{k-1}\right), \text{ with } LF_0^{k-1} = 1 \tag{1.d}$$

Figure 3:
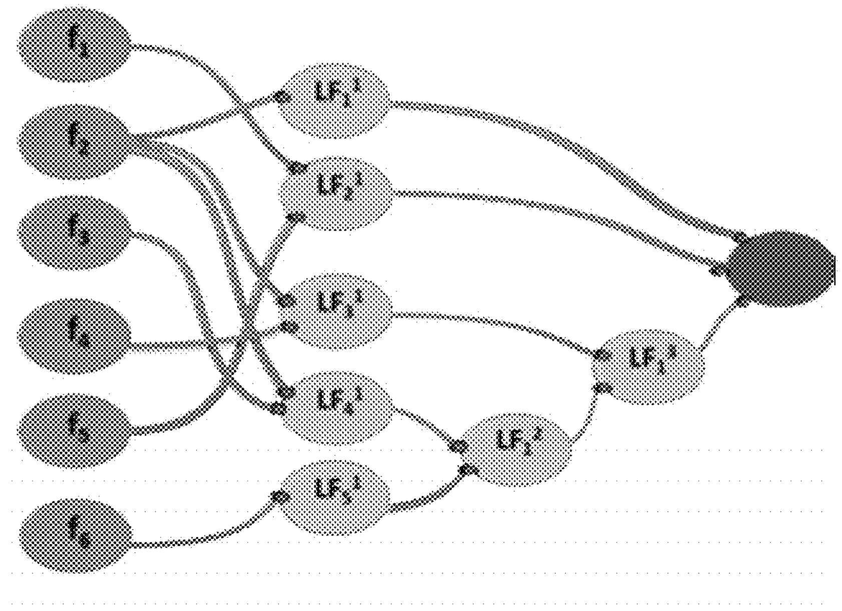
FIG. 3 is an example explainable neural network model with interpretable latent features, in accordance with one embodiment.

Referring to FIG. 3, an interpretable neural network model with interpretable latent features is provided, where an interpretable latent feature is a sparse function of one or more input features (typically 1 or 2 features), or alternatively, a function of one or more latent features from prior layers. This interpretable neural network training system and method may employ a resolution technique based on repeated estimation and application of lasso regularization on each hidden node, or more generally involve constrained training to limit the model architecture to only allowing a few (typically 1 or 2 connections) connections.

The interpretable latent features may be either a function of one or more input features, or alternatively, function of one or more latent features from prior layers. An upper threshold on number of incoming connections to each latent feature is applied to enable a latent feature to be interpretable. This architecture, in one embodiment, limits the number of relationships leveraged by the neural network and the result is that often the resultant model doesn't learn biases hidden in the dataset as these often are not major drivers in the outcome unless the neural network is oversubscribed in degrees of freedom.

Chasing maximal performance which is often the goal of the unaware data scientist increases the degrees of freedom forcing usage of more learnt relationships resulting in models that are more likely to enable bias and learn noise in datasets. This interpretable neural network methodology doesn't guarantee complete elimination of bias from the model even though it often achieves that objective given the limited relationships constrained in its training objective.

As noted earlier, the conventional technology used for eliminating first order and second order effects of bias associated with a protected class while necessary are not sufficient. Furthermore, using the outcome tag as a way to remediate bias in model training has been subject to legal limitations. To overcome the above shortcomings associated with eliminating bias in a model, in one or more embodiments, an improved bias mitigation technology is implemented that focuses on examining the latent features learnt by the model with respect to the protected classes and without relying on the performance outcome tag.

In an example embodiments, neural network models learn latent features explicitly and interpretable neural networks enable a clear means to remediate and remove unwanted learned relationships. For investigation purposes, the activation of one or more of the latent features is explicitly computed. This is possible due to the latent features having a closed form as given by equations 1.a through 1.d. It is further noted that in one embodiment, we leverage interpretable latent features based on interpretable neural networks to expose and investigate the nature of the relationship learnt along with the nature of the bias, and to take corrective remedial actions based on those learning.

Protected classes, such as race, gender, ethnicity, and the various categorical values, or class values associated with those classes are important to evaluate in terms of activation of learned latent features when it is desirable to understand possible drivers of disparate impact or bias in models. It is noted that often protected classes are not made available to model developers and so they can also be derived using industry accepted practices such as inferred using algorithms such as Bayesian Improved Surname Geocoding (BISG), for example.

In certain aspects, operations are performed at the latent feature level, instead of the raw variables or derived features. For example, a latent feature, $$LF_j^k$$

is examined to determine whether the latent feature shows any bias with respect to any of the protected classes, $PC_m$, where m represents the index of the protected class. For example, $PC_1$ could be race, $PC_2$ could be marital status, $PC_3$ could be gender etc. The distribution of the activation values of one or more of the $$LF_j^k$$

is also determined, when proxied on a protected class. For an unbiased latent feature $$LF_j^k,$$

the distribution of its activation values across various class values of a protected class, $PC_m$, would be statistically similar.

The disclosed methods herein may be utilized to mitigate bias related, but not limited, to one or more of the categories listed below as related to predictive models implemented for loan/mortgage origination, credit risk account management, fraud detection, and propensity, or as related to decisions made about incarceration/sentencing/parole/release, or employment or educational admission scenarios.

Race,
Color,
Religion (including religious dress and grooming practices),
Sex/gender (including pregnancy, childbirth, breastfeeding and/or related medical conditions),
Gender identity, gender expression,
Sexual orientation,
Marital status,
Medical Condition (genetic characteristics, cancer or a record or history of cancer),
Military or veteran status,
National origin (including language use and possession of a driver's license issued to persons unable to provide their presence in the United State as authorized under federal law),
Ancestry,
Disability (mental and physical including HIV/AIDS, cancer, and genetic characteristics),
Genetic information,
Request for family care leave,
Request for leave for an employee's own serious health condition,
Request for Pregnancy Disability Leave,
Retaliation for reporting patient abuse in tax-supported institutions, and
Age (over 40)

As another example, while analyzing for racial bias, if race is used as a protected class with 3 class values (e.g., White, Black, and Hispanic), then one would expect the distributions of the activation value of each $$LF_j^k$$

for the three values, namely White, Black and Hispanic to be statistically similar in the absence of an implicit racial bias in latent feature $$LF_j^k.$$

The dissimilarity in distribution for a latent feature with respect to the three class values of race will on the other hand indicate that the latent feature has embedded bias with respect to the protected class, race, and remedial actions need to be taken to remove the latent feature from the neural network.

To quantify the disparate impact as attributed to the dissimilarity of distribution, different techniques may be employed. For example, Chi-square statistics may be used to compute the corresponding P-value to quantify if any dissimilarity in distribution of the latent feature across different class values of a protected class is by chance or is statistically significant, with P-value computed based on Chi-square statistics indicating whether the dissimilarity is significant or not.

Figure 4A:
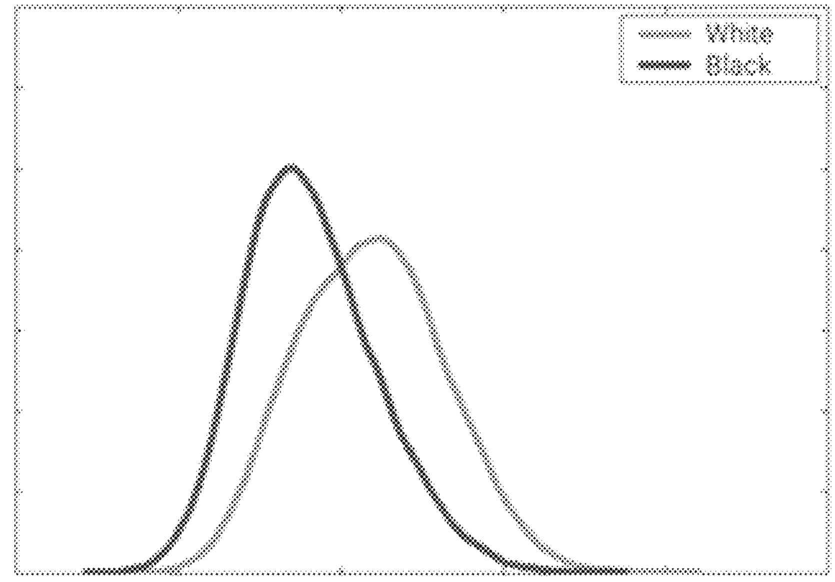
FIG. 4A is an example illustration of a distribution of an activation value of a latent feature with respect to two class values, in accordance with one or more aspects.

Referring to FIG. 4A, the distribution of the activation value of a latent feature, $$LF_j^k,$$

with respect to two class values, White and Black, of the protected class, race is illustrated. In one aspect, if there is no disparate impact of the latent feature between two class values, then the two corresponding curves shown would be overlapping. The farther separated the distributions the more it is likely that the latent feature has disparate impact on the protected class, race. To determine whether the separation, if any, is by chance or statistically significant, we begin by binning the range of the values that the latent feature takes into N equal sized bins. N=10 is often a good example which yields 10 equal sized bins, popularly called deciles.

Figure 4B:
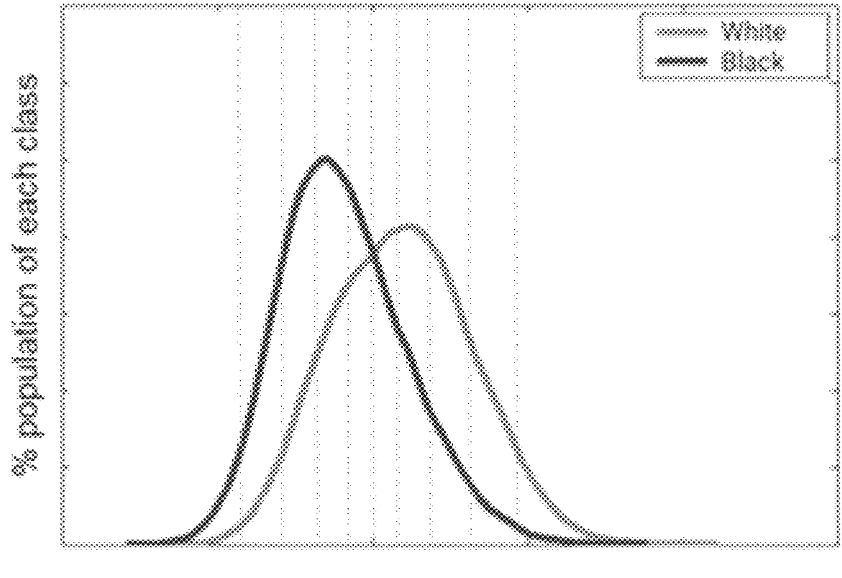
FIG. 4B is an example illustration of the distribution in FIG. 4A alongside decile bins of the latent feature in one or more embodiments.

Referring to FIG. 4B, the same distribution as in FIG. 4A alongside the decile bins of the latent feature is illustrated. As shown, distribution of the activation value of the latent feature, $$LF_j^k,$$

from FIG. 4A is provided with decile bins shown with vertical gray dotted lines. The count of a class value may be then tabulated (e.g., White and Black in the above example) across some or all the bins. The row totals and column totals may be computed in a two-way table as in Chi-square statistics.

Referring to FIG. 4C, a two-way table for an example scenario is illustrated, where the latent feature, $$LF_j^k$$

has been binned into N bins, and the protected class $PC_m$, has P class values. The cell value, Cij represents the instances of the $i^{th}$ class value in the $j^{th}$ bin, $Bin_j$. Note that the total for a column, representing a single class value, adds up to total number of records corresponding to that class value, and the grand total of both the column totals and row totals adds up to the total records in the dataset in this example implementation. As shown, in case of protected class being race, the class value 1 would be White, class value 2 would be Black, class value 3 would be Hispanic etc.

For a cell in the two-way table of FIG. 4C, the expected values are computed as prescribed by the method for computed Chi-square statistics. The expected value for a cell in a two-way table is equal to (row total*column total)/(grand total), where grand total is equal to the total number of observations in the dataset. The expected value is represented by Eij corresponding to the $i^{th}$ class value in the $j^{th}$ bin, $Bin_j$. Thus, expected value Eij is given by the following equation:

$$E_{ij} = \frac{\left(\sum_j C_{ij}\right)*\left(\sum_i C_{ij}\right)}{\left(\sum_{i,j} C_{ij}\right)} \tag{2.a}$$

The Chi-square statistics is then given by:

$$X = \sum_{i,j} \frac{(C_{ij} - E_{ij})^2}{E_{ij}} \tag{2.b}$$

With degrees of freedom given by:

$$df = (N-1)*(P-1) \tag{2.c}$$

As we know, the chi-square distribution is defined for one or more or all positive values. The P-value for the chi-square statistics is the probability of observing a value at least as extreme as the test statistic for a chi-square distribution with df degrees of freedom as given by the following and tabulated for distributions:

$$P\text{-value} = P(\chi > X^2), \text{ where degrees of freedom} = df \tag{2.d}$$

In certain embodiments, P-values of 0.01 or lower are considered as statistically significant result, indicative of dissimilarity between the various class values of the protected class, $PC_m$, for the latent feature, $$LF_j^k.$$

In such a case the latent, $$LF_j^k,$$

feature may be investigated and marked as biased, for example. There would be no need to further analyze that latent feature for bias with respect to any other protected class.

Alternative methods to measuring disparate impact as attributed to the dissimilarity of distribution and quantify confidence in it, are equally valid. Subsequently, the effort goes towards eliminating the bias by ensuring that the model doesn't learn those latent features. Investigating all the latent features for disparate impact of all the protected classes, as indicated by equations 2.a, 2.b, 2.c and 2.d allows for determination of all latent features which show bias with respect to any protected class.

As a latent feature, $$LF_j^k$$

is identified that shows bias with respect to any protected class $PC_m$, one may investigate the constituent factors that define the biased latent feature, $$LF_j^k.$$

If the constituent factors are the input variables, then we must disallow those input variables from interacting in the model to ensure the biased latent feature is not learnt by the model. If the constituent factors are latent features from prior hidden layers, then we must disallow those constituent latent features from interacting in the model to ensure the biased latent feature is not learnt by the model. We do this by identifying all the input variables that constitute those constituent latent features and disallow them from interacting in the model. We explain this in more detail in the subsequent sections.

From efficiency perspective, we first investigate the latent features of the lower order and eliminate biases from them, before moving on to the higher order. Thus, we first investigate and eliminate all bias from the latent features in the first hidden layer of the model, before moving on to the second hidden layer, and so on. Equation (1) provides us with a mechanism for determining the features on which latent features of the first hidden layer are dependent upon. Note that in a fully connected neural network the latent features in the first layer are function of all the input variables which makes the problem of removing the biased relationship not tractable without using techniques such as interpretable neural networks discussed above.

For an interpretable latent feature based interpretable neural network, the latent features in the first hidden layer are a function of a subset of the input variables (typically only two) as shown in FIG. 3. The biased latent features in the first hidden layer of the model represent the third order effect of biased data elements.

Figure 5A:
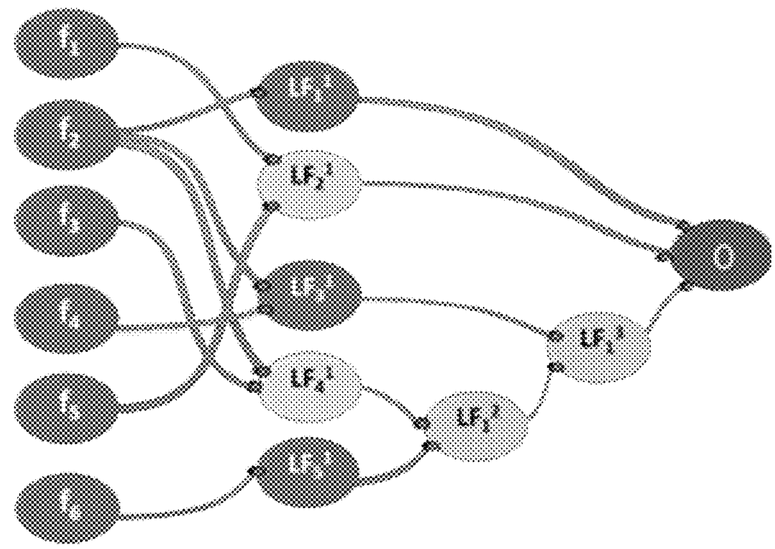
FIG. 5A is an example scenario that corresponds to the model in FIG. 3, where two of the latent features in the first hidden layer have been found to have statistically significant disparate impact for at least one protected class.

Referring to FIG. 5A, an example scenario is illustrated that corresponds to the model in FIG. 3, where two of the latent features in the first hidden layer $$\left(LF_2^1 \text{ and } LF_4^1\right)$$

have been found to have statistically significant disparate impact for at least one protected class based on the P-value computed using Chi-square statistics as given by equations (2).

$$LF_2^1 \text{ and } LF_4^1$$

nodes thus represent latent features which have bias with respect to at least one of the protected classes.

If one of the latent features $$LF_2^1$$

has the following form:

$$LF_2^1 = S\left(w_{02}^1 + w_{12}^1 \cdot f_1 + w_{52}^1 \cdot f_5\right),$$

this indicates that $f_1$ and $f_5$ interact in a non-linear manner to impute bias into the model by way of the learnt latent feature, $$LF_2^1.$$

Note that we began by training the model such that none of the input features have any first order (data element) or second order (derived features) bias impact on the model. Consequently, to eliminate the bias due to the non-linear interaction of the two offending input variables, $f_1$ and $f_5$, they should not be allowed to interact with each other in the model.

Referring to FIG. 5B, a list of set of input features can be generated by iterating over the biased latent features that have bias with respect to a protected class. The set of input features may include pairs, triplets, quartets, and so on. As shown in the illustrative table of FIG. 5B, often set of features (e.g., (f1, f5) that should not be allowed to interact in the model can be listed as corresponding to the biased latent feature $$\left(LF_2^1\right).$$

The example table shows a list of latent features in the first hidden layer which show bias, along with the constituent input features. Disallowing interaction between the input features in each set would eliminate the bias inducing latent features and would allow the model to train to explore other relationships.

Mechanism for eliminating interactions between two or more specified variables within an explainable neural network model may be used to mark the offending features that are not allowed to interact. For example, in the example of FIG. 5B, $f_1$ and $f_5$ are not allowed to interact with each other and similarly, $f_2$ and $f_3$ are not allowed to interact with each other. This may be performed for all the sets of input features or lower-order latent features that are identified to constitute the higher order biased latent features. Once this is done, the model is retrained, and the resulting latent features in the first hidden layer are again investigated for indications of bias.

As additional iterations of investigation on the first hidden layer are carried out, new latent features with statistically significant disparate impact may be identified for at least one protected class as given by equations (2). This implies additional set of features, among the input features that constitute biased latent features, which should not be allowed to interact. Thus, the original list of sets of non-interacting features may be expanded to include new feature sets that are not allowed to interact.

Figure 5C:
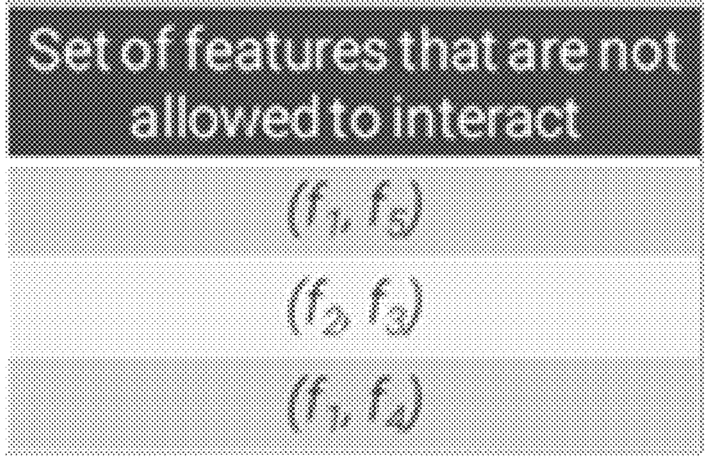
FIG. 5C is an example expanded version of the list shown in FIG. 5B after a few iterations of model retrain, in accordance with one or more embodiments.

Referring to FIG. 5C, an example expanded version of the list shown in FIG. 5B is shown, after a few iterations of model retrain. If the model is retrained again, this updated list is used to disallow interactions in the model based on the identification that these feature interactions impute bias in the model. The iteration may be repeated until all third order effects of bias have been eliminated. As these restrictions are imposed and model is retrained, the resultant model's structure and the latent features that it learns change.

Figure 5D:
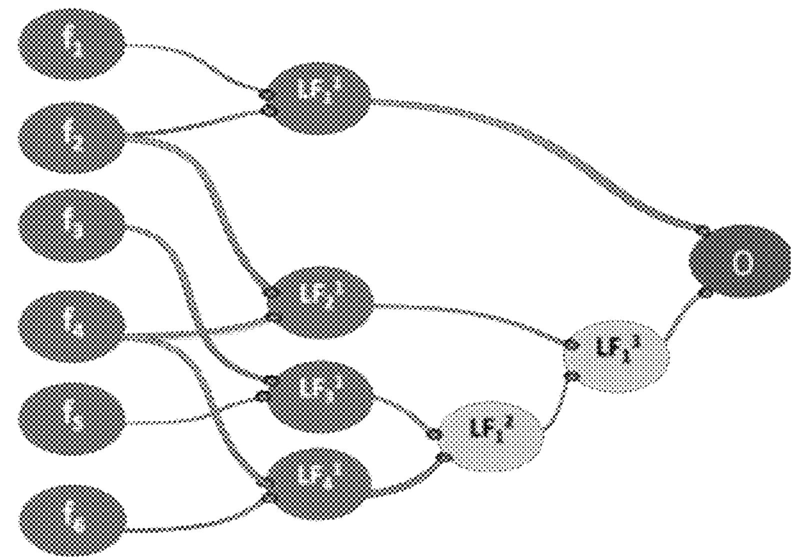
FIG. 5D is an example of an explainable neural network corresponding to the model in FIG. 5A, in accordance with one or more aspects.

Referring to FIG. 5D, an example of an explainable neural network corresponding to the model in FIG. 5A is illustrated. Following the process described so far, the model's latent features in the first hidden layer have been investigated and shown to be free of any bias. In some aspects, if there is more than one hidden layer, the latent features in the subsequent hidden layers are then investigated. The latent features in a layer are then investigated against the protected classes by computing statistical significance of the disparate impact based on Chi-square statistics as given by equations (2). The additional further investigation over the remaining hidden layers provides for identifying the latent features which show bias with respect to at least one protected class. These are biases of higher orders. For example, a biased latent feature in the second hidden layer constitutes the fourth order effects of bias.

Figure 5E:
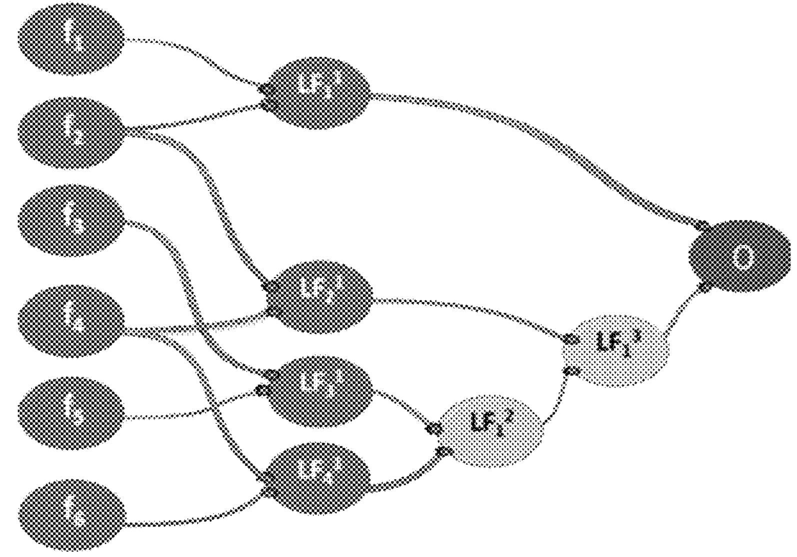
FIG. 5E is an example corresponding to the model in FIG. 5D, where a latent feature in the second hidden layer has been found to have bias with respect to at least one protected class.

Referring to FIG. 5E, an example corresponding to the model in FIG. 5D, where a latent feature, $$LF_2^1,$$

in the second hidden layer, has been found to have bias with respect to at least one protected class. The latent features in the subsequent hidden layers are functions of the latent features from prior layers. For example, in FIG. 5E, the latent feature $$LF_2^1$$

is based on $$LF_3^1$$

and $$LF_4^1$$

with the relationship is given by the following equation:

$$LF_1^2 = S\left(w_{01}^2 + w_{31}^2 \cdot LF_3^1 + w_{41}^2 \cdot LF_4^1\right)$$

For the biased latent features in a layer, the interaction between the constituent latent features lead to the bias, even though those constituent latent features are themselves not biased. To eliminate these learnt relationships from the model, as discussed briefly earlier, the constituent latent features are not allowed to interact with the goal to, for example, eliminate $$LF_1^2$$

without eliminating $$LF_3^1 \text{ and } LF_4^1,$$

given that these two latent features have survived in the prior layer and hence they are both important as well as free from bias themselves.

In one or more embodiments, in order to eliminate biased features, the constituent latent features of the biased latent features are replaced by their respective constituent latent features in an iterative manner, until latent features from the first hidden layer remain. Thus we are able to identify the set of input features defining the sequence of latent features leading up to the offending latent feature that are not allowed to interact with each other in the model. Notably, no restriction is put on the subsets drawn from such a set of features, unless those restrictions were already discovered in previous iterations.

Figure 5F:
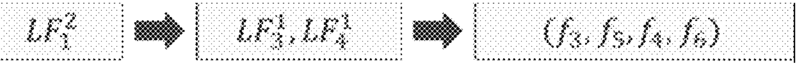
FIG. 5F is an example iterative resolution of a biased latent feature to determine the input feature sets which are not allowed to have interaction.

Referring to FIG. 5F, an iterative resolution of the biased latent feature $$LF_1^2$$

is illustrated in order to determine the input feature sets which are not allowed to have interaction. Since $$LF_1^2$$

has been determined to exhibit bias, it is concluded that the bias arises due to the interaction of the constituent latent features $$LF_3^1 \text{ and } LF_4^1.$$

Hence to eliminate this bias, it is desirable to eliminate $$LF_3^1 \text{ and } LF_4^1$$

from interacting. So, the input features variables, $$f_3 \text{ and } f_5,$$

which define $$LF_3^1$$

and $f_4$ and $f_6$, which define $$LF_4^1$$

should not be allowed to interact with each other in the model. This determination can be effectively made using the process shown in FIG. 5F.

Considering $$LF_1^2$$

in the above example, the input features set ($f_3$, $f_5$ $f_4$ and $f_6$) are marked to not interact simultaneously, while no new restriction on interaction is put on subsets such as ($f_3$, $f_5$). This ensures that while $$LF_3^1 \text{ and } LF_4^1$$

are allowed to form, they will not interact to form $$LF_1^2.$$

Sets of identified input features, that are not allowed to interact, may be added to the existing list of set of input features that are not allowed to interact. Thus, the list shown in FIG. 5C may continue to expand as shown in FIG. 5G.

Figure 5G:
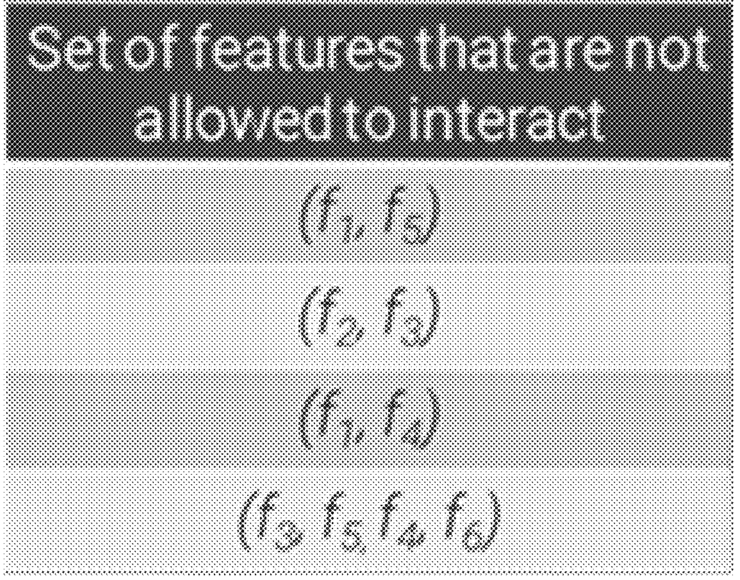
FIG. 5G is an example expanded list of set of interacting features in accordance with one or more embodiments.

Referring to FIG. 5G, an expanded list of set of interacting features is illustrated. In this example, the listed features are not allowed to interact because after iteratively investigating the biased latent feature until the second hidden layer of the model shown in FIG. 5E, it has been determined that these sets of features impute bias in the model due to their interactions. After retraining the model with the expanded list of disallowed interactions between input features, further investigation of the latent features may be again performed from the first hidden layer onwards.

If any of the latent features in the first hidden layer are biased, the biased latent features are eliminated from the first hidden layer like as provided earlier. Then, the latent features in the second layer are monitored and investigated for bias. If any of the latent features in the second hidden layer are biased, the biased latent features from the second hidden layer will be eliminated. Then, the latent features in the subsequent hidden layers, if any, are investigated for bias. This iterative approach is followed until certain or all latent features in the model are free of any bias with respect to any of the protected classes, as indicated by the P-value computed based on Chi-square statistics as given by equations (2).

The usage of an interpretable latent feature based neural network has two distinct advantages over fully connected neural networks, while removing bias. First, the nature of the bias is understood more meaningfully due to the interpretable nature of the latent feature. Second, a parsimonious list of set of input features are arrived at for eliminating interactions within them. These advantages are over and above the previously mentioned benefit of such an architecture usually eliminating most of the bias on their own due to their parsimonious architecture.

It is also worth noting that while searches for interaction between input features that induce bias in the model are performed, the number of sets of input features that are identified to induce bias are often a small fraction of all the interaction terms that are possible in the model. For example, if n input features are provided, with a latent feature not allowed to have more than two constituent input nodes, this will still allow formation of a total of $$\frac{n(n-1)}{2}$$

possible pairs of input features, whereas the number of pairs of input features that induce bias would be a small fraction of total number of possible pairs.

The entire process of model training, bias investigation, and subsequent retraining to eliminate the biases may be summarized in the following illustrative process, which is an example of a possible implementation without limiting the scope of the disclosed subject matter to any particular details or form disclosed. The illustrative example and any alternative implementations of the example process disclosed here may apply to any given dataset where an outcome tag is available for training a supervised machine learning model, such as a fully connected neural network, or an explainable neural network model with interpretable latent features used in any AI system.

Illustrative Example Implementation

1. Identify a list of protected classes, $PC = \{PC_1, PC_2, \ldots PC_m\}$.
2. Conduct correlation analysis of all the protected classes with the list of all raw variables in the dataset, r, and all derived features, x.
3. Identify a list of input features, $I = \{f_1, f_2, \ldots f_n\}$ which are neither protected classes (step 1) nor the features that are correlated with the protected classes (step 2). This ensures elimination of first and second order effect of bias. Note that $I \subseteq (r \cup x)$
4. Create an empty list to maintain sets of features that are not allowed to interact, O = [ ]
5. Train a model, M using the list of input features, I, and the list of input feature sets, O, that are not allowed to have interaction in the model M.
6. For k in (1 to <number of hidden layers of model, M>)
    a. Extract all latent features, $LF_j^k$ based on equations (1).
    b. For each $LF_j^k$ Bias investigation A. For each protected class, $PC_m$ in PC
            i. Bin the latent features, $LF_j^k$, in N bins. N can be a universal constant or can be specified per latent feature.
            ii. Generate the two-way table with counts, $C_{ij}$.
            iii. Compute Eij using equation (2.a).
            iv. Compute Chi-square statistics for latent features, $LF_j^k$, and protected class, $PC_m$ using equation (2.b).
            v. Compute degrees of freedom and P-value using equations (2.c) and (2.d).

-continued vi. If P-value shows statistical significance at, for example 0.01, we have found a biased latent feature.
  1. If k = 1
    a. Identify the input features that contitute $LF_j^k$.
    b. Add the features as a set to the list O.
  2. If k > 1
    a. Create an empty set, S = ( ).
    b. Identify the latent features that contitute $LF_j^k$ and add to S.
    c. Iterate over constituent, C, of S until S has no latent feature left
      i. If C is a latent feature from the first hidden layer, then replace C with a set of constituent input features.
      ii. If C is a latent feature from the second hidden layer or subsequent hidden layer, replace C with its constituents.
    d. Add S to O.
    e. Skip to next latent feature. Go to Step 6.b.

B. If none of the latent features in $k^{th}$ hidden layer has bias
  i. Go to next hidden layer: k = k + 1.

c. If none of the latent features in any of the hidden layers has bias
  i. Go to step 7.

d. Else
  i. Go to step 5.

7. Stop.

Figure 6:
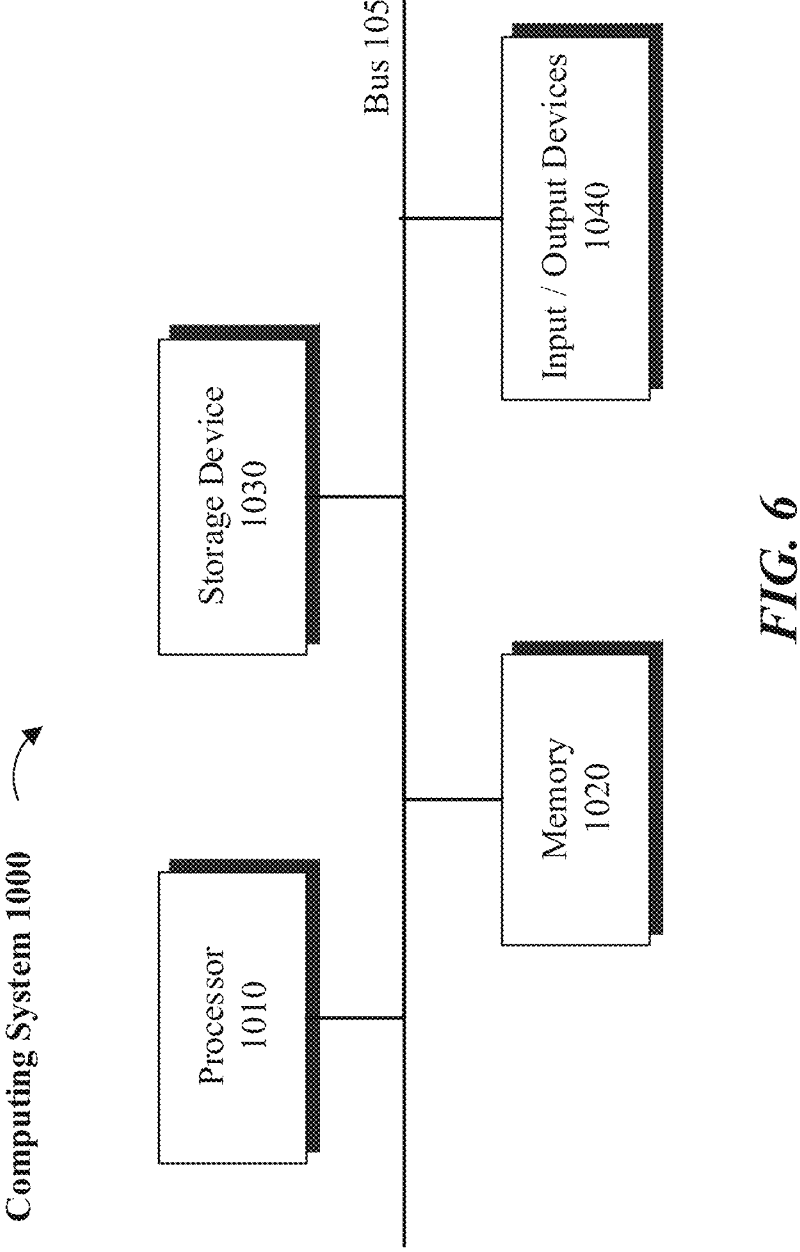
FIG. 6 is a block diagram of an example computing system that may be utilized to perform one or more computing operations or processes as consistent with one or more disclosed features.

Referring to FIG. 6, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies or processes disclosed herein in a computing environment using, for example, one or more processors or controllers, as provided below.

As shown in FIG. 6, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

COPYRIGHT & TRADEMARK NOTICES

A portion of the disclosure of this patent document may contain material, which is subject to copyright protection. The applicant has no objection to the reproduction of the patent documents or the patent disclosure as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method for execution by one or more processors in a special purpose computing machine to eliminate bias from artificial intelligent (AI) systems, wherein the execution of the method comprises:

identifying a plurality of features derived from one or more class identifiers represented in training data fed to an AI system for purpose of training a predictive model in the AI system, the predictive model having:

one or more input layers, one or more output layers, one or more hidden layers connecting the one or more input layers to the one or more output layers, and at least one edge connecting two layers in the predictive model, the edge representing an interaction between features in the two layers and being associated with a weight, which is adjustable to train the predictive model towards less bias;

conducting correlation analysis of input features from a list of raw variables, r, in a dataset and a plurality of derived features, x, associated with the one or more class identifiers;

identifying a first list of features, one or more features in the first list correlated with the one or more class identifiers according to the correlation analysis;

creating a second list including sets of input features associated with at least one latent feature in a hidden layer of the predictive model, the second list identifying combinations of input features that are not allowed to interact due to learned nonlinearities that result in bias in the hidden layer;

training the predictive model using the first list and the second list to eliminate the bias from the predictive model by removing from the predictive model one or more interactions between the identified set of combinations of input features that are not allowed to interact due to the learned nonlinearities, wherein for one or more hidden layers in an interpretable neural network model, interpretable latent features in the hidden layers are extracted to investigate whether a first latent feature from among the latent features in the hidden layers contains a bias, wherein the first latent feature is determined to be biased, in response to determining that the first latent feature results in a discriminatory distribution against a protected class of individuals identified by the one or more class identifiers, wherein for a protected class, the latent feature output is binned into N bins, such that N is a universal constant specified per latent feature, and wherein a two-way table is generated with counts, $C_{ij}$, where a latent feature, $$LF_j^k$$

is binned into the N bins, and a protected class $PC_m$, has P class values, and a cell value, Cij represents an instance of the $i^{th}$ class value in the $j^{th}$ bin.

2. The method of claim 1, wherein an expected value Eij is given by:

$$E_{ij} = \frac{\left(\sum_j C_{ij}\right) * \left(\sum_i C_{ij}\right)}{\left(\sum_{i,j} C_{ij}\right)}.$$

3. The method of claim 2, wherein chi-square statistics is given by:

$$X = \sum_{i,j} \frac{(C_{ij} - E_{ij})^2}{E_{ij}}.$$

4. The method of claim 3, wherein a P-value for the chi-square statistics is computed to determine a statistical significance of difference in a chi-square distribution with df degrees of freedom.

5. The method of claim 1, wherein determination of a biased latent feature towards a class value results in determining the combination of input features contributing to the latent feature and the combination of features being added to the second list of sets of input features.

6. The method of claim 5, wherein the biased latent feature is approximated with a sparse set of multiple latent features to explode the latent feature into a set of lower complexity latent features and nonlinearities, the sparse set of lower complexity latent features being investigated for bias to determine which lower complexity latent features are identified as being biased, wherein the identified latent features are added to the second list of sets of input features.

7. A system comprising:

at least one programmable processor; and a non-transitory machine-readable medium storing instructions that, when executed by the at least one programmable processor, cause the at least one programmable processor to perform operations comprising:

identifying a plurality of features derived from one or more class identifiers represented in training data fed to an AI system for purpose of training a predictive model in the AI system, the predictive model having:

one or more input layers, one or more output layers, one or more hidden layers connecting the one or more input layers to the one or more output layers, and at least one edge connecting two layers in the predictive model, the edge representing an interaction between features in the two layers and being associated with a weight, which is adjustable to train the predictive model towards less bias;

conducting correlation analysis of input features from a list of raw variables, r, in a dataset and a plurality of derived features, x, associated with the one or more class identifiers;

identifying a first list of features, one or more features in the first list correlated with the one or more class identifiers according to the correlation analysis;

creating a second list including sets of input features associated with at least one latent feature in a hidden layer of the predictive model, the second list identifying combinations of input features that are not allowed to interact due to learned nonlinearities that result in bias in the hidden layer;

training the predictive model using the first list and the second list to eliminate the bias from the predictive model by removing from the predictive model one or more interactions between the identified set of combinations of input features that are not allowed to interact due to the learned nonlinearities, wherein for one or more hidden layers in an interpretable neural network model, interpretable latent features in the hidden layers are extracted to investigate whether a first latent feature from among the latent features in the hidden layers contains a bias, wherein the first latent feature is determined to be biased, in response to determining that the first latent feature results in a discriminatory distribution against a protected class of individuals identified by the one or more class identifiers, wherein for a protected class, the latent feature output is binned into N bins, such that N is a universal constant specified per latent feature, and wherein a two-way table is generated with counts, $C_{ij}$, where a latent feature, $$LF_j^k$$

is binned into the N bins, and a protected class $PC_m$, has P class values, and a cell value, Cij represents an instance of the $i^{th}$ class value in the $j^{th}$ bin.

8. The system of claim 7, wherein an expected value Eij is given by:

$$E_{ij} = \frac{\left(\sum_j C_{ij}\right) * \left(\sum_i C_{ij}\right)}{\left(\sum_{i,j} C_{ij}\right)}.$$

9. The system of claim 8, wherein chi-square statistics is given by:

$$X = \sum_{i,j} \frac{(C_{ij} - E_{ij})^2}{E_{ij}}.$$

10. A computer program product comprising a non-transitory machine-readable medium storing instructions that, when executed by at least one programmable processor, cause the at least one programmable processor to perform operations comprising:

identifying a plurality of features derived from one or more class identifiers represented in training data fed to an AI system for purpose of training a predictive model in the AI system, the predictive model having:

one or more input layers, one or more output layers, one or more hidden layers connecting the one or more input layers to the one or more output layers, and at least one edge connecting two layers in the predictive model, the edge representing an interaction between features in the two layers and being associated with a weight, which is adjustable to train the predictive model towards less bias;

conducting correlation analysis of input features from a list of raw variables, r, in a dataset and a plurality of derived features, x, associated with the one or more class identifiers;

identifying a first list of features, one or more features in the first list correlated with the one or more class identifiers according to the correlation analysis;

creating a second list including sets of input features associated with at least one latent feature in a hidden layer of the predictive model, the second list identifying combinations of input features that are not allowed to interact due to learned nonlinearities that result in bias in the hidden layer;

training the predictive model using the first list and the second list to eliminate the bias from the predictive model by removing from the predictive model one or more interactions between the identified set of combinations of input features that are not allowed to interact due to the learned nonlinearities, wherein for one or more hidden layers in an interpretable neural network model, interpretable latent features in the hidden layers are extracted to investigate whether a first latent feature from among the latent features in the hidden layers contains a bias, wherein the first latent feature is determined to be biased, in response to determining that the first latent feature results in a discriminatory distribution against a protected class of individuals identified by the one or more class identifiers, wherein for a protected class, the latent feature output is binned into N bins, such that N is a universal constant specified per latent feature, and wherein a two-way table is generated with counts, $C_{ij}$, where a latent feature, $$LF_j^k$$

is binned into the N bins, and a protected class $PC_m$, has P class values, and a cell value, Cij represents an instance of the $i^{th}$ class value in the $j^{th}$ bin.

* * * * *